United States Patent [19]

Shimizu et al.

[11] Patent Number: 5,305,553
[45] Date of Patent: Apr. 26, 1994

[54] WEATHERSTRIP STRUCTURE FOR AUTOMOTIVE VEHICLE

[75] Inventors: Toshimitsu Shimizu, Kanagawa; Tomio Sugawara, Chiba; Yuji Sakamaki, Chiba; Takahiro Usuta, Chiba, all of Japan

[73] Assignees: Nissan Motor Company, Limited; Kinugawa Rubber Industrial Co. Ltd., both of Japan

[21] Appl. No.: 634,728

[22] Filed: Dec. 27, 1990

[30] Foreign Application Priority Data

Dec. 28, 1989 [JP] Japan ............................ 1-344795
Dec. 28, 1989 [JP] Japan ............................ 1-344796

[51] Int. Cl.⁵ ............................................. E06B 7/16
[52] U.S. Cl. ................................ 49/490.1; 49/496.1
[58] Field of Search ............... 49/496, 485, 490, 491, 49/498, 497

[56] References Cited

U.S. PATENT DOCUMENTS

| | | | |
|---|---|---|---|
| 3,638,359 | 2/1972 | Kruschwitz | 49/490 |
| 4,030,245 | 6/1977 | Yeomans | 49/490 |
| 4,447,065 | 5/1984 | Dupuy et al. | 49/491 X |
| 4,690,412 | 9/1987 | Tuckley et al. | 49/490 X |
| 4,702,039 | 10/1987 | Bocchinfuso | 49/490 |
| 4,745,016 | 5/1988 | Hashimoto et al. | |
| 4,769,950 | 9/1988 | Ogawa et al. | 49/490 |
| 4,787,668 | 11/1988 | Kawase et al. | 49/491 X |
| 4,848,035 | 7/1989 | Sakuma et al. | |
| 4,918,867 | 4/1990 | Hayashi et al. | 49/491 X |
| 4,937,126 | 6/1990 | Jackson | 49/490 X |
| 4,951,418 | 8/1990 | Keys | 49/490 X |

FOREIGN PATENT DOCUMENTS

| | | |
|---|---|---|
| 0117747 | 9/1984 | European Pat. Off. |
| 2748682 | 5/1978 | Fed. Rep. of Germany ........ 49/491 |
| 2006309 | 5/1979 | United Kingdom ................. 49/490 |
| 2095315 | 9/1982 | United Kingdom . |
| 2153420 | 8/1985 | United Kingdom . |
| 2172642 | 9/1986 | United Kingdom . |

Primary Examiner—Peter M. Cuomo
Assistant Examiner—Jerry Redman
Attorney, Agent, or Firm—Ronald P. Kananen

[57] ABSTRACT

A weatherstrip structure for an automotive vehicle includes a reversed U-shaped main body to define a space which is open toward an upright mounting flange provided at a vehicle body opening edge. A first grasping lip is provided in the space extending from one of side sections of the main body defining the space. A second grasping lip is further provided extending into the space from a lower end of the other of the side sections. The second lip is adapted to make a tilting movement relative to the other of the side sections so as to facilitate insertion of the mounting flange into the space. A stopper projection is provided between the second lip and the other of the side sections for limiting the tilting movement of the second lip toward the other of the side sections so as to prevent the second lip from excessively tilting toward the other of the side sections. A sponge rubber projection may be provided independently of or along with the stopper projection at an inward tip portion of the second lip. The sponge rubber projection is adapted to be pressed against the mounting flange by a reaction force of the second lip after the second lip is tilted toward the other of the side sections to allow the insertion of the mounting flange into the space.

12 Claims, 7 Drawing Sheets

WEATHERSTRIP STRUCTURE FOR AUTOMOTIVE VEHICLE

BACKGROUND OF THE INVENTION

1. Field of the Invention

The present invention relates generally to a weatherstrip structure for an automotive vehicle. More specifically, the present invention relates to a weatherstrip structure for an automotive vehicle which can provide a highly reliable sealing effect at a vehicle body opening edge, i.e. between inside and outside of a vehicle body.

2. Description of the Background Art

A weatherstrip for sealing a space between, such as, a vehicle body opening edge and a trunk lid, is disclosed such as in U.S. Pat. No. 4,848,035 issued on Jul. 18, 1989.

In this background art, the weatherstrip includes an elongate main body made of a solid rubber. The main body includes an elongate upper section and a pair of elongate side sections facing each other so as to have a substantially reversed U-shaped cross-section. First and second grasping lips are provided extending inward from the corresponding opposite side sections at vertically intermediate positions thereof for holding therebetween an upright flange provided at the vehicle body opening edge. Specifically, the first grasping lip extends from one of the side sections located inside the vehicle body with respect to the flange (hereinafter referred to as "inside section"), while, the second grasping lip extends from the other of the side sections located outside the vehicle body (hereinafter referred to as "outside section"). A third grasping lip is further provided extending inward from the inside section at a vertical position lower than the first grasping lip.

A seesaw lip is further provided at a lower end of the outside section and connected thereto through a linkage section. The linkage section is formed thinner in width than the other portions of the outside section. Specifically, the seesaw lip has a grasping lip section extending inward from the linkage section and a sub-lip section extending outward from the linkage section substantially in a direction opposite to that of the grasping lip section. The first to third grasping lips and the seesaw lip are made of the same material as the main body except for an outward tip of the seesaw lip, i.e. a tip of the sub-lip section. The tip of the sub-lip is made of sponge rubber (rubber foam) other than the solid rubber.

When the weatherstrip is depressed to receive the upright flange therein, the flange is grasped under pressure between the first and second grasping lips and between the third grasping lip and the grasping lip section of the seesaw lip so that the weatherstrip is firmly retained on the upright flange. Further, during the insertion of the upright flange into the weatherstrip, the seesaw lip is arranged to pivot or tilt with the linkage section working as a fulcrum. Accordingly, assembling of the weatherstrip onto the upright flange is facilitated. Simultaneously, the pivotal or tilting movement of the seesaw lip allows the sub-lip section to pivot inward until the sponge rubber tip of the sub-lip is pressed against a planar surface which is an outward extension from the upright flange and arranged substantially in perpendicular to the upright flange, so as to ensure a sealing effect therebetween.

On the other hand, since the seesaw lip is rather easily pivoted using the linkage section as the fulcrum, it is likely that the seesaw lip is tilted excessively during assembling of the weatherstrip onto the upright flange. This excessive pivotal movement of the seesaw lip causes less pressure applied between the grasping lip section of the seesaw lip and the upright flange, and further causes the sponge rubber tip of the sub-lip section to partially bend or turn up inward so as to generate small gaps between the outward extension of the flange and the sponge rubber tip of the sub-lip section. Accordingly, the sealing effect provided by the grasping lip section and the sub-lip section of the seesaw lip inevitably becomes significantly less to allow invasion of water and dust into the vehicle body.

Further, since the grasping lip section of the seesaw lip is made of the solid rubber having a relatively high rigidity, the inward tip of the grasping lip section can not precisely follow configuration of an outer surface of the upright flange against which the inward tip of the grasping lip section is pressed. For example, when a difference in level or a step is formed on the outer surface of the upright flange due to superposition of another flange at a joint portion therebetween, or a seal paint is applied to the above-noted stepped portion to provide a rugged surface thereon, the inward tip of the grasping lip section can not precisely follow such a configuration on the outer surface of the upright flange so that gaps are generated therebetween to allow invasion of water and dust into the vehicle body.

SUMMARY OF THE INVENTION

Accordingly, it is an object of the present invention to provide a weatherstrip structure for an automotive vehicle, that can eliminate the above-noted defects inherent in the background art.

It is another object of the present invention to provide a weatherstrip structure for an automotive vehicle, that can ensure a highly reliable sealing effect at a vehicle body opening edge, i.e. between inside and outside of a vehicle body.

To accomplish the above-mentioned and other objects, according to one aspect of the present invention, a weatherstrip structure for an automotive vehicle comprises a main body having first, second and third sections. The second and third sections extend substantially in parallel with each other from opposite ends of the first section so as to define therebetween a space which is open at its one end remote from the first section toward a weatherstrip mounting member fixed to a vehicle body for receiving the weatherstrip mounting member into the space. The second section is to be located inside the vehicle body with respect to the weatherstrip mounting member and the third section is to be located outside the vehicle body with respect to the weatherstrip mounting member.

A first lip is provided extending into the space from an inner surface of the second section, the inner surface defining the space. The first lip is arranged to be pressed against one side of the weatherstrip mounting member when the weatherstrip mounting member is received in the space.

A second lip is further provided extending into the space from one end of the third section remote from the first section. The second lip is adapted to make a tilting movement relative to the third section so as to facilitate insertion of the weatherstrip mounting member into the space.

Projection means is further provided between the second lip and an inner surface of the third section, the inner surface of the third section defining the space, for limiting the tilting movement of the second lip toward the inner surface of the third section to prevent the second lip from tilting toward the inner surface of the third section beyond a predetermined level, so as to allow the second lip to be pressed against the other side of the weatherstrip mounting member by means of a reaction force of the second lip to firmly hold the weatherstrip mounting member between the first and second lips.

According to another aspect of the present invention, a weatherstrip structure for an automotive vehicle comprises a main body having first, second and third sections. The second and third sections extend substantially in parallel with each other from opposite ends of the first section so as to define therebetween a space which is open at its one end remote from the first section toward a weatherstrip mounting member fixed to a vehicle body for receiving the weatherstrip mounting member into the space. The second section is to be located inside the vehicle body with respect to the weatherstrip mounting member and the third section is to be located outside the vehicle body with respect to the weatherstrip mounting member.

A first lip is provided extending into the space from an inner surface of the second section, the inner surface facing the space. The first lip is arranged to be pressed against one side of the weatherstrip mounting member when the weatherstrip mounting member is received in the space.

A second lip is further provided extending into the space from one end of the third section remote from the first section. The second lip is adapted to make a tilting movement relative to the third section so as to facilitate insertion of the weatherstrip mounting member into the space.

Projection means is further provided at an inward tip portion of the second lip remote from the third section. The projection means is made of a material having less rigidity than that of the second lip and adapted to be pressed against the other side of the weatherstrip mounting member by reaction force applied to the projection means from the second lip when the second lip is tilted toward the inner surface of the third section to allow the insertion of the weatherstrip mounting member into the space, so as to firmly hold the weatherstrip mounting member between the first lip and the projection means.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 1A:
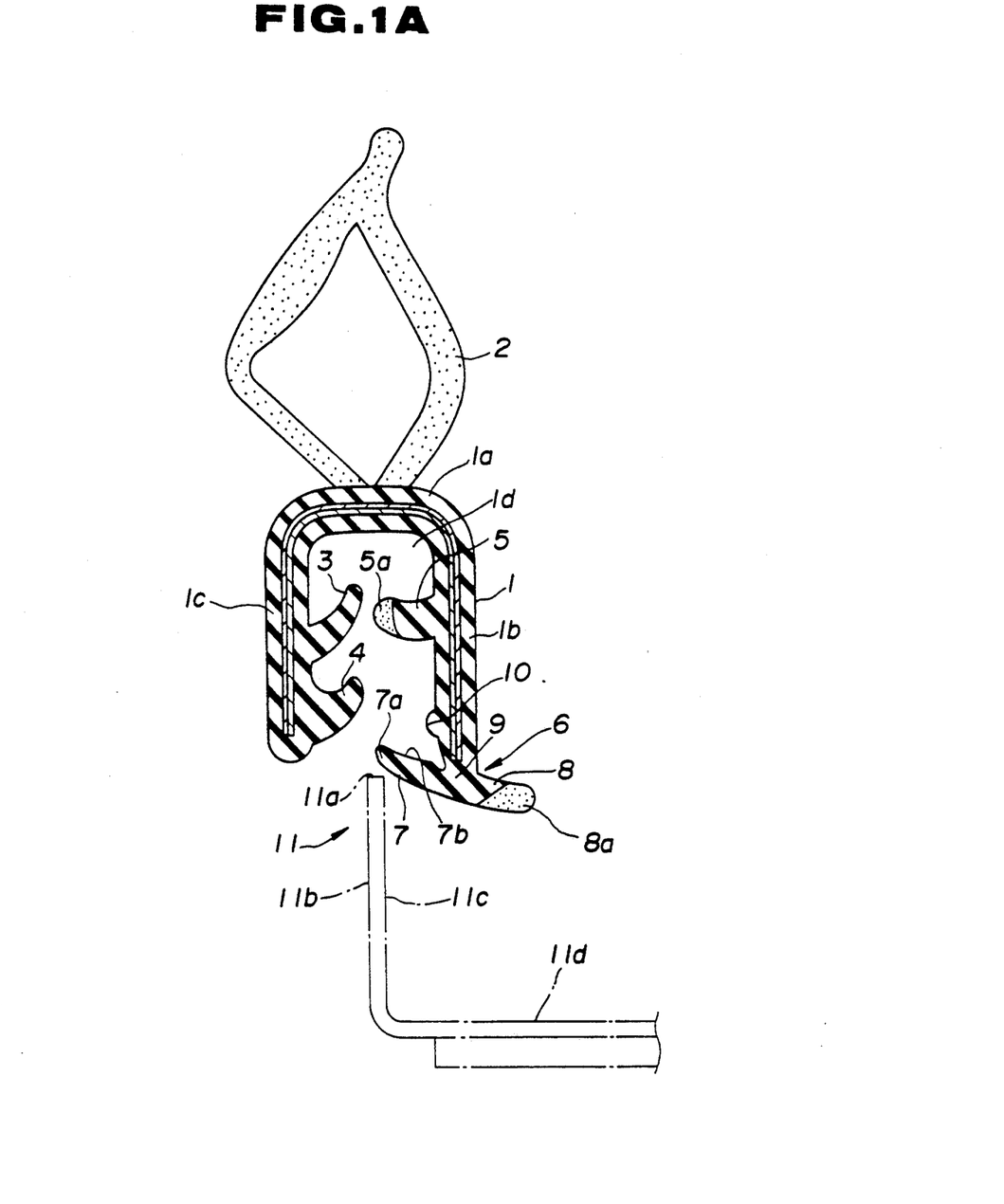
FIG. 1A is a cross-sectional view showing a weatherstrip structure for an automotive vehicle according to a first preferred embodiment of the present invention.
Figure 1B:
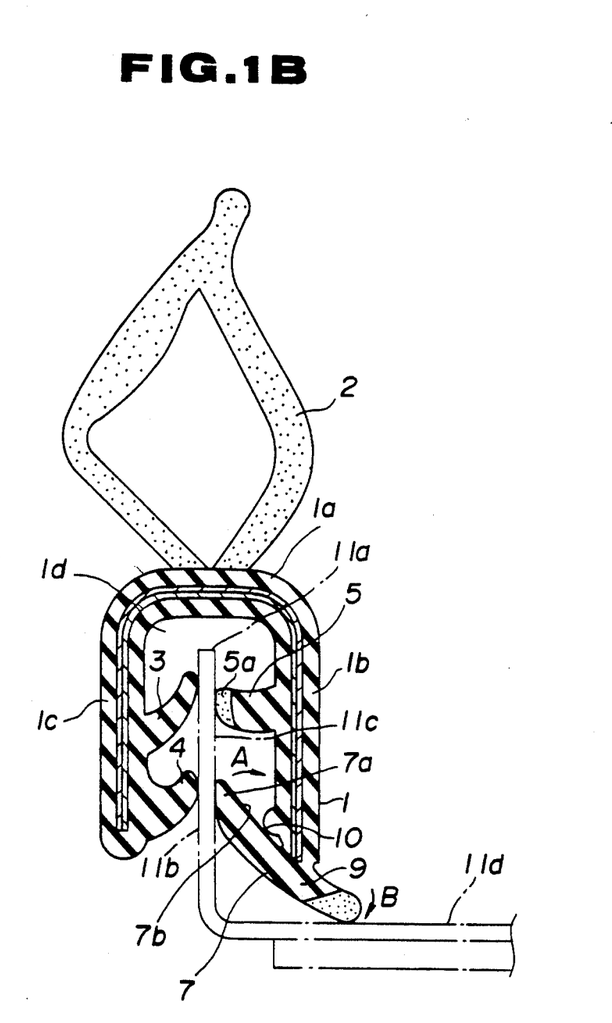
FIG. 1B is a cross-sectional view showing the weatherstrip structure of FIG. 1A, wherein a corresponding mounting flange is received in a main body of the weatherstrip structure.

Referring now to the drawings, FIGS. 1A and 1B show a first preferred embodiment of a weatherstrip structure for an automotive vehicle according to the present invention.

In FIGS. 1A and 1B, the weatherstrip structure is applied for sealing an opening edge of a vehicle body and a trunk lid. A welt 1 as a main body of the weatherstrip is made of a solid rubber and has a substantially reversed U-shaped cross-section. The welt 1 is an elongate member and includes an upper section 1a and a pair of side sections 1b and 1c to define an elongate space 1d which is open downward. A hollow sealing member 2 made of a sponge rubber is fixedly disposed on the upper section 1a and extends over a full length of the welt 1. The sealing member 2 is brought into close contact with a peripheral edge of the trunk lid when the latter is closed.

Grasping lips 3, 4 and 5 are provided in the space 1d. Specifically, the grasping lip 3 extends from the side section 1c toward the opposite side section 1b, and the grasping lip 4 extends from the side section 1c at a position lower than the grasping lip 3 toward the opposite side section 1b. The grasping lip 5 extends from the side section 1b toward the opposite side section 1c so as to substantially face the grasping lip 3 at their tips. In this embodiment, the grasping lip 5 has a portion 5a at its tip made of a sponge rubber. Further, a seesaw lip 6 is provided at a lower end of the side section 1b. The seesaw lip 6 has a grasping lip section 7 and a sub-lip section 8 and is connected to the lower end of the side section 1b through a linkage section 9 which is formed thinner in width than the other portions of the side section 1b. Specifically, the grasping lip section 7 extends from the linkage section 9 toward the opposite side section 1c, while, the sub-lip section 8 extends from the linkage section 9 in a direction substantially opposite to that of the grasping lip section 7. Accordingly, when an upward or downward force is applied to the grasping lip section 7, the seesaw lip 6 makes a pivotal or tilting movement with the thin linkage section 9 working as a fulcrum. An outer tip 8a of the seesaw lip 6, i.e. a tip 8a of the sub-lip section 8 is formed of the sponge rubber. As seen from FIG. 1A, an inward tip 7a of the seesaw lip 6, i.e. a tip of the grasping lip section 7 is arranged significantly lower than a tip of the corresponding grasping lip 4. Similarly, the linkage section 9 is also arranged lower than a base portion of the grasping lip 4 where the grasping lip 4 is connected to the side section 1c.

In practice, the grasping lips 3, 4 and 5 and the seesaw lip 6 are integral extensions of the welt 1 and made of the same material as the welt 1, i.e. the solid rubber except for the tips 5a and 8a which are made of the sponge rubber. As appreciated, the grasping lips 3, 4 and 5 and the seesaw lip 6 extend over the full length of the welt 1.

Further, a stopper projection 10 made of the solid rubber is integrally formed at an inner surface of the side section 1b, spacing a given distance from the linkage section 9. The stopper projection 10 has a substantially semicircular cross-section and extends over the full length of the welt 1. The stopper projection 10 works as a stopper for limiting the pivotal or tilting movement of the seesaw lip 6 so as to define a maximum tilted position of the seesaw lip 6.

A flange member 11 is provided at the vehicle body opening edge so as to surround the latter. The flange member 11 has an upright mounting flange 11a having inner and outer surfaces 11b and 11c with respect to the vehicle body, and further includes an integral outer extension 11d from the upright mounting flange 11a. The outer extension 11d is arranged substantially in perpendicular to the upright flange 11a.

As shown in FIG. 1B, when the weatherstrip having the foregoing structure is depressed onto the upright flange 11a so as to receive it in the space 1d of the welt 1, the upright flange 11a first allows the grasping lip section 7 of the seesaw lip 6 to make the pivotal movement in a clockwise direction as indicated by an arrow A, and then warps the grasping lip 4 upward. Subsequently, the grasping lips 3 and 5 are warped to receive the upright flange 11a therebetween so that the upright flange 11a is tightly held between the grasping lips 3 and 5 and the grasping lip 4 and the grasping lip section 7 of the seesaw lip 6. Since the maximum tilting movement of the grasping lip section 7 in the direction A is defined by the abutment between the projection 10 and a portion of an upper surface 7b of the grasping lip section 7 neighboring the linkage section 9, prevention of the excessive tilting movement of the seesaw lip 6 is ensured. As a result, the tip 7a of the grasping lip section 7 is tightly pressed against the outer surface 11c of the upright flange 11a due to elastic reaction forces from the projection 10 and of the grasping lip section 7 itself. Further, as noted above, since the excessive tilting movement of the seesaw lip 6 is effectively prevented, the pivotal movement of the sub-lip section 8 in a direction as indicated by an arrow B is also controlled so as to prevent the sponge rubber tip 8a of the sub-lip section 8 from partially bending or turning up inward. Accordingly, the sponge rubber tip 8a of the sub-lip 8 is evenly pressed against the outer extension 11d of the flange member 11 to ensure highly reliable water-tightness therebetween. As a result, the reliable sealing effect is provided through double sealing, i.e. between the sponge rubber tip 8a of the sub-lip 8 and the outer extension 11d of the flange member 11 and between the tip 7a of the grasping lip section 7 and the outer surface of the upright flange 11a.

Further, the sponge rubber tip 5a of the grasping lip 5 ensures a highly reliable water-tightness relative to the outer surface 11c of the upright flange 11a to improve the sealing effect therebetween.

Still further, the pivotal movement of the seesaw lip 6 in the direction A before the abutment between the grasping lip section 7 and the stopper projection 10 facilitate insertability of the weatherstrip due to reduction of the friction force between the tip 7a of the grasping lip section 7 and the outer surface 11c of the upright flange 11a. It is to be appreciated that this insertability of the weatherstrip is further improved by means of the vertically offset arrangement of the grasping lip 4 and the grasping lip section 7 of the seesaw lip 6.

Figure 2:
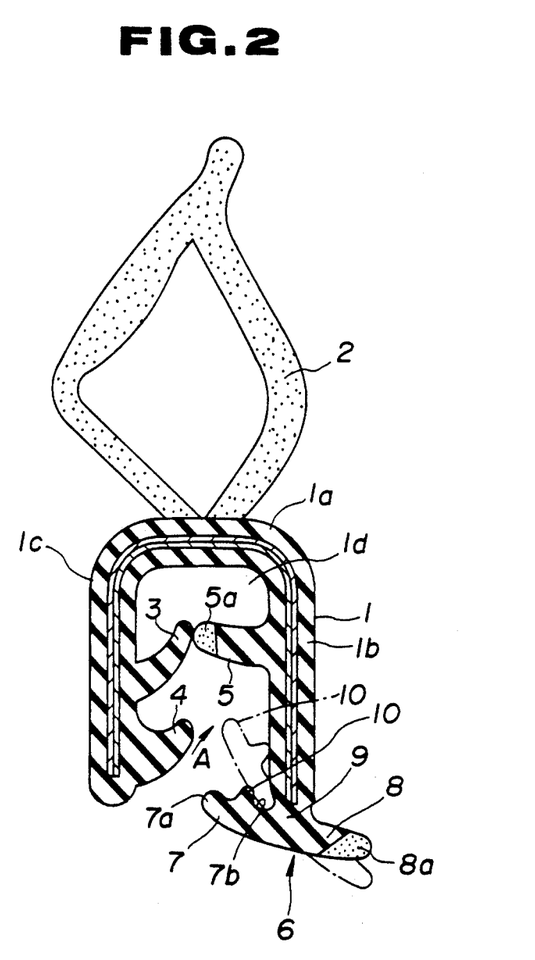
FIG. 2 is a cross-sectional view showing a weatherstrip structure for an automotive vehicle according to a second preferred embodiment of the present invention.

FIG. 2 shows a second preferred embodiment of the weatherstrip structure according to the present invention. In FIG. 2, the same or like members or elements are designated by the same reference numerals as in FIGS. 1A and 1B so as to omit further explanation thereof for avoiding a redundant disclosure.

In the second preferred embodiment, the stopper projection 10 in the first preferred embodiment is provided on the upper surface 7b of the grasping lip section 7 of the seesaw lip 6. Specifically, as shown in FIG. 2, the stopper projection 10 is formed integral with the seesaw lip 6 substantially at a center position of the upper surface 7b across its width. As in the first preferred embodiment, the stopper projection 10 on the upper surface 7b extends over the full length of the grasping lip section 7. The other structures are substantially the same as in the first preferred embodiment. As appreciated, the stopper projection 10 in the second preferred embodiment functions substantially in the same manner as in the first preferred embodiment to define the maximum tilting movement of the seesaw lip 6 in the direction A by means of the abutment between the stopper projection 10 on the upper surface 7b and the inner surface of the side section 1b of the welt 1. Accordingly, the reliable sealing effect is ensured between the sponge rubber tip 8a of the sub-lip 8 and the outer extension 11d of the flange member 11 and between the tip 7a of the grasping lip section 7 and the outer surface 11c of the upright flange 11a.

It is to be appreciated that the stopper projections 10 may be provided both on the upper surface 7b of the grasping lip section 7 and on the inner surface of the side section 1b of the welt 1. In this case, the stopper projections 10 may be arranged facing each other at their tips, or being vertically offset from each other. In case the stopper projections 10 are arranged being offset from each other, more reliable stopper effects are ensured to define the maximum inclination of the seesaw lip 6.

It is to be further appreciated that, by varying a position or a height of the stopper projection 10, the maximum tilted position of the seesaw lip 6 can be optimumly set.

Figure 3:
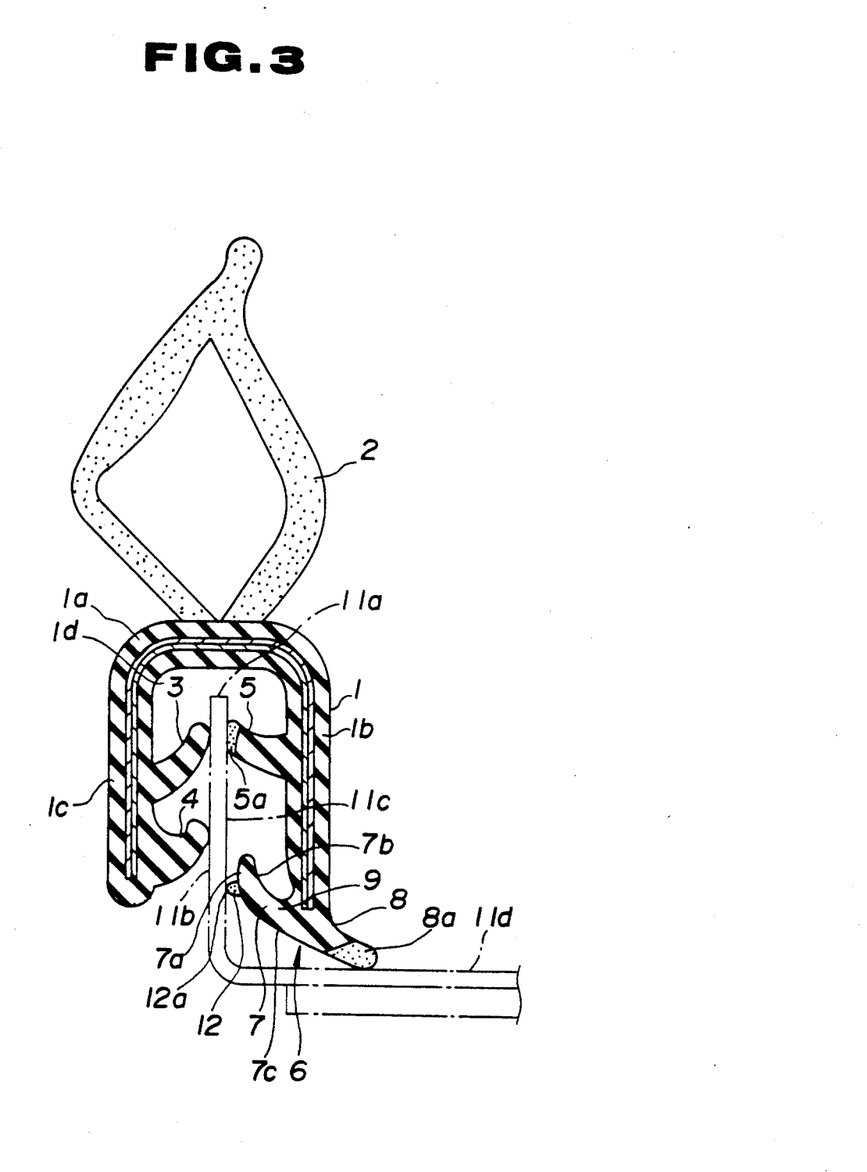
FIG. 3 is a cross-sectional view showing a weatherstrip structure for an automotive vehicle according to a third preferred embodiment of the present invention.
Figure 4:
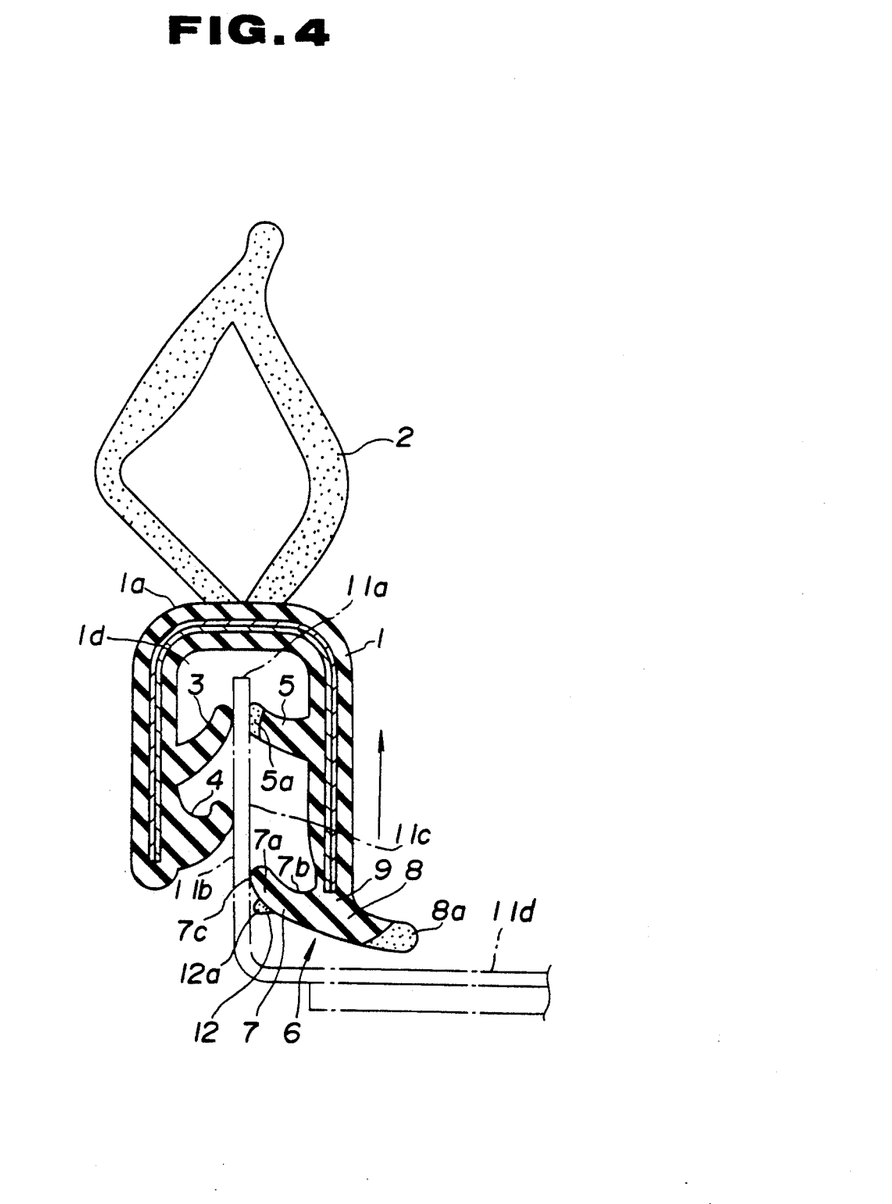
FIG. 4 is a cross-sectional view showing the weatherstrip structure of FIG. 3, wherein a releasing force is applied to the weatherstrip structure.

FIGS. 3 and 4 show a third preferred embodiment of the weatherstrip structure according to the present invention, wherein the same or like members or elements are designated by the same reference numerals as in FIGS. 1A and 1B so as to omit further explanation thereof for avoiding a redundant disclosure.

In the third preferred embodiment, a projection 12 is further provided for improving the sealing effect. Specifically, the projection 12 is made of the sponge rubber and fixed to a lower surface 7c of the grasping lip section 7 at a position below the inward tip 7a so as to be pressed against the outer surface 11c of the upright flange 11a when the weatherstrip receives the upright flange 11a in the spaced 1d of the welt 1. The projection 12 has a substantially traingular cross-section with an acute angle tip 12a and extends over the full length of the grasping lip section 7. In the third preferred embodiment, as seen in FIG. 3, the stopper projection 10 provided in the first or second preferred embodiment is not provided. The other structures are substantially the same as in the first preferred embodiment.

In the third preferred embodiment, when the weatherstrip is depressed onto the upright flange 11a so as to receive it in the space 1d of the welt 1, the upright flange 11a first allows the grasping lip section 7 of the seesaw lip 6 to make the tilting movement in a clockwise direction in FIG. 3, then the tip 12a of the sponge rubber projection 12 gets in direct contact with the outer surface 11c of the upright flange 11a as shown in FIG. 3. Since the projection 12 is made of the sponge rubber, the tip 12a thereof can precisely follow configuration of the outer surface 11c of the upright flange 11a to effectively prevent the generation of the gaps between the outer surface 11c of the upright flange 11a and the tip 12a of the sponge rubber projection 12 so as to provide a highly improved sealing effect therebetween. This sealing effect is further improved by means of a substantial line contact which is provided between the acute angle tip 12a and the outer surface 11c of the upright flange 11a. As appreciated, the line contact facilitates the precise trace of the tip 12a of the sponge rubber projection 12 on the outer surface 11c of the upright flange 11a.

The other operation is substantially the same as in the first preferred embodiment. Accordingly, the reliable sealing effect is ensured between the sponge rubber tip 8a of the sub-lip 8 and the outer extension 11d of the flange member 11 and between the tip 12a of the sponge rubber projection 12 and the outer surface 11c of the upright flange 11a.

Further, since the sponge rubber projection 12 is pressed against the outer surface 11c with a relatively small force due to the tilting movement of the seesaw lip 6 and a small rigidity of the sponge rubber projection 12 during assembling of the weatherstrip onto the upright flange 11a, the insertability of the weatherstrip is further improved, in addition to the vertical offset arrangement of the grasping lip section 7 of the seesaw lip 6 and the grasping lip 4. This further prevents distortion of the sponge rubber projection 12 during the assembling of the weatherstrip so as to ensure the substantial line contact between the outer surface 11c of the upright flange 11a and the tip 12a of the sponge rubber projection 12.

FIG. 4 shows the state of the weatherstrip wherein a force is applied to the weatherstrip in an upper direction as indicated by an arrow, i.e. in a releasing direction of the weatherstrip after the weatherstrip has been assembled onto the upright flange 11a. Specifically, when the force is applied to the weatherstrip in the releasing direction, the seesaw lip 6 makes a pivotal movement in a counterclockwise direction in FIG. 4 using the linkage section 9 as a fulcrum so that the sponge rubber projection 12 fixed to the grasping lip section 7 gets away from the outer surface 11c of the upright flange 11a, and instead, the lower surface 7c at the tip 7a of the solid rubber grasping lip section 7 is pressed against the outer surface 11c of the upright flange 11a due to the reaction force of the seesaw lip 6. Accordingly, a friction force between the outer surface 11c and the contacting surface of the solid rubber grasping lip section 7 ensures preventing the weatherstrip from accidentally releasing from the upright flange 11a.

Figure 5:
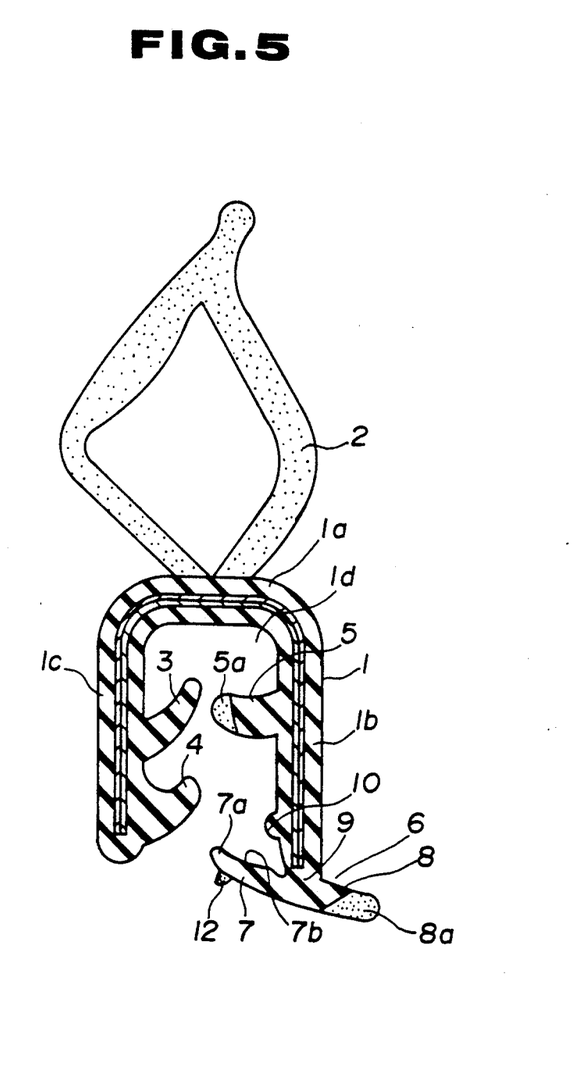
FIG. 5 is a cross-sectional view showing a weatherstrip structure for an automotive vehicle according to a fourth preferred embodiment of the present invention.
Figure 6:
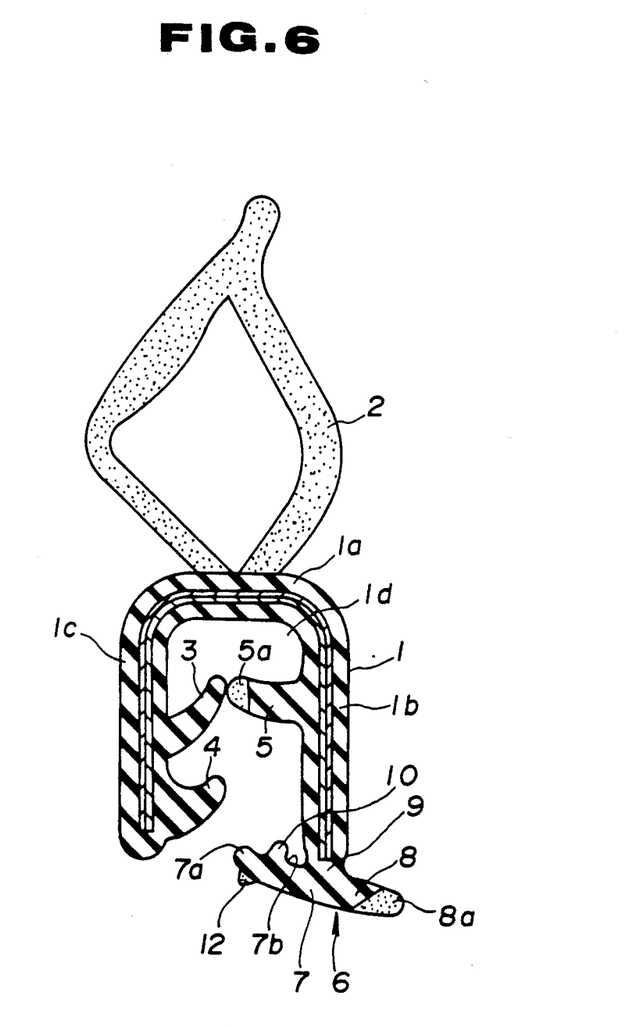
FIG. 6 is a cross-sectional view showing a weatherstrip structure for an automotive vehicle according to a fifth preferred embodiment of the present invention.

FIGS. 5 and 6 respectively show fourth and fifth preferred embodiments, wherein the same or like members or elements are designated by the same reference numerals as in FIGS. 1A to 4 so as to omit further explanation thereof for avoiding a redundant disclosure.

In the fourth preferred embodiment of FIG. 5, the weatherstrip includes both the stopper projection 10 in the first preferred embodiment of FIG. 1A and the sponge rubber projection 12 in the third preferred embodiment of FIG. 3. As appreciated, further improved sealing effect can be attained by combining the first and third preferred embodiments. The height of the stopper projection 10 may be adjusted to ensure the optimum sealing effect between the sponge rubber projection 12 and the outer surface 11c of the upright flange 11a and between the sponge rubber tip 8a of the sub-lip 8 and the outer extension 11d of the flange member 11.

In the fifth preferred embodiment of FIG. 6, the weatherstrip includes both the stopper projection 10 in the second preferred embodiment of FIG. 2 and the sponge rubber projection 12 in the third preferred embodiment of FIG. 3. As appreciated, further improved sealing effect similar to the fourth preferred embodiment can be attained by combining the second and third preferred embodiments. The height of the stopper projection 10 may be adjusted to ensure the optimum sealing effect between the sponge rubber projection 12 and the outer surface 11c of the upright flange 11a and between the sponge rubber tip 8a of the sub-lip 8 and the outer extension 11d of the flange member 11.

It is to be understood that this invention is not to be limited to the embodiments described above, and that various changes and modifications may be made without departing from the spirit and scope of the invention as defined in the appended claims.

For example, the linkage section 9 in the first to fifth preferred embodiments is not necessarily formed thinner than the other portions of the outer side section 1b of the welt 1 as long as a required pivotal or tilting movement of the seesaw lip 6 is ensured. Further, the sponge rubber projection 12 in the third to fifth preferred embodiments may have a substantially semicircular cross-section or a substantially rectangular cross-section or the like. Still further, the weatherstrip according to the present invention is applicable not only for sealing space between the vehicle body opening edge and the trunk lid but also for sealing other space, for example, between the vehicle body opening edge and a vehicular door.

What is claimed is:

1. A weatherstrip structure for an automotive vehicle, comprising:

a main body having first, second and third sections, said second and third sections extending substantially in parallel with each other from opposite ends of said first section so as to define therebetween a space which is open at one end remote from said first section for receiving a weatherstrip mounting member fixed to a vehicle body into said space, said second section being positioned to be located inside the vehicle body with respect to said weatherstrip mounting member and said third section being positioned to be located outside the vehicle body with respect to said weatherstrip mounting member;

a first lip extending into said space from an inner surface of the second section, said inner surface facing said space, said first lip being arranged to be pressed against one side of said weatherstrip mounting member when said weatherstrip mounting member is received is said space;

a second lip connected on said third section near said open end of said space via a linkage portion and having an inner extending section which extends into said space from said linkage portion and an outer extending section which extends from said linkage portion in a direction opposite to that of the inner extending section, said second lip being adapted to tilt relative to the third section by means of said linkage portion to allow said inner and outer extending sections to tilt relative to the third section as one integral unit; and projection means provided at least on said inner extending section of the second lip or on an inner surface of the third section, said inner surface of the third section facing said space, for limiting the tilting movement of the second lip beyond a predetermined level, said projection means and said second lip being so arranged that, when the tilting movement of the second lip is limited by said projection means, said inner extending section presses against the other side of the weatherstrip mounting member to firmly hold the weatherstrip mounting member between said first lip and said inner extending section of the second lip, and simultaneously, said outer extending section is pressed at its outer end remote from said linkage portion against the vehicle body for providing a reliable sealing therebetween.

2. The weatherstrip structure as set forth in claim 1, wherein said projection means is a projection provided on said inner surface of the third section, and wherein the inner extending section of the second lip is prevented from tilting toward the inner surface of the third section beyond the predetermined level by abutment between said inner extending section of the second lip and said projection.

3. The weatherstrip structure as set forth in claim 2, wherein said projection is formed integral with said third section.

4. The weatherstrip structure as set forth in claim 1, wherein said projection means is a projection on the inner extending section of the second lip so that the inner extending section of the second lip is prevented from tilting toward the inner surface of the third section beyond the predetermined level by abutment of the projection and the inner surface of the third section.

5. The weatherstrip structure as set forth in claim 1, wherein said first and second lips are arranged offset relative to each other so that the weatherstrip mounting member first pushes the inner extending section of the second lip and then the first lip when the weatherstrip mounting member is received in said space.

6. The weatherstrip structure as set forth in claim 1, wherein said linkage portion is formed thinner in width than the third section to allow said second lip to tilt relative to the third section.

7. The weatherstrip structure as set forth in claim 1, wherein said outer end of the outer extending section is made of sponge rubber.

8. The weatherstrip structure as set forth in claim 1, wherein said inner extending section of the second lip includes a projection at an inward tip portion opposite from said linkage portion such that said projection is pressed against said other side of the weatherstrip mounting member when the tilting movement of the second lip is limited by said projection, and wherein said projection comprises a material having a smaller rigidity than other portions of the second lip.

9. The weatherstrip structure as set forth in claim 8, wherein said projection is made of sponge rubber.

10. The weatherstrip structure as set forth in claim 8, wherein said projection has a substantially triangular cross-section with an acute angled tip which presses against said other side of the weatherstrip mounting member.

11. The weatherstrip structure as set forth in claim 8, wherein said projection is provided closer to the open end of said space defined in the main body than said inward tip portion of the inner extending section of the second lip such that said projection is pressed against said other side of the weatherstrip mounting member with said inward tip portion of the inner extending section being out of contact with said other side of the weatherstrip mounting member when the tilting movement of the second lip is limited by said projection means, wherein said inward tip portion of the inner extending section is pressed against said other side of the weatherstrip mounting member with said projection being out of contact with said other side of the weatherstrip mounting member when the main body is moved in a releasing direction from the weatherstrip mounting member.

12. The weatherstrip structure as set forth in claim 11, wherein said projection has a substantially triangular cross-section with an acute angled tip which is pressed against said other side of the weatherstrip mounting member to provide a substantially linear contact therebetween.

* * * * *